3,356,508
CONTINUOUS PROCESS FOR HIGH-FLAVORING MAPLE SIRUP
Charles O. Willits, North Hills, and Joseph C. Underwood, Sr., Plymouth Meeting, Pa., assignors to the United States of America as represented by the Secretary of Agriculture
No Drawing. Filed Apr. 21, 1965, Ser. No. 449,899
7 Claims. (Cl. 99—142)

ABSTRACT OF THE DISCLOSURE

A continuous, flexible process for developing flavor and color in maple sirup in which sirup is forced through small diameter tubing and heated instantly to a preselected temperature. When the sirup has been in the heating zone for a time sufficient to produce the desired flavor and color, it is forced through small diameter tubing in a second zone where it is rapidly cooled to below its atmospheric boiling point. Since the sirup at this stage is in a sterile state, it can be released directly into an appropriate packaging container.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to the preparation of maple products of intensified maple flavor and color.

Maple sirups of intensified maple flavor and color are important for preparing blended sirups and for contributing maple flavor without unduly increasing the sugar content of certain comestibles.

Maple sirup for use in the manufacture of blended cane-maple sirups must be of sufficient flavor to permit extending it 7 or more fold with cane sugar sirup. Although the demand for a high-flavored sirup has existed for a long time, only a few processes for preparing such a product have been described. Typically, maple sirup is heated batchwise to 225–260° F., preferably about 250° F., for several hours, as described in U.S. Patent Nos. 2,054,873, 2,549,877, and 2,715581, to obtain a sirup of intensified maple flavor. All of the processes require one-half hour or more at 250–260° F. plus heat-up and cool-down time.

The heat treatment, however, also enhances the development of off-flavor materials. Even better grades of sirup develop the off-flavors and the time of heating must be limited or the product will be unsatisfactory for flavoring most foods. U.S. Patent No. 2,895,833 describes an alcohol digestion process by which off-flavor materials are largely eliminated by their reaction with ethanol.

None of the prior art processes provides flexibility in adjusting operating conditions during processing to compensate for differences in batches of sirup or for other variables so that the color and flavor of those products are subject to considerable variation.

An object of the present invention is to provide a simple, rapid method for intensification of maple flavor with a minimum development of off-flavors.

Another object of the present invention is to provide conditions for developing a more intense maple flavor by activating more of the precursors and potentiators in the maple sirup.

A further object is to provide a continuous process for preparing high-flavored maple sirup.

Still another object is to provide a high-flavoring process in which the volume of the sirup is not altered.

Another object is to provide a flexible process in which the time-temperature conditions applied to the sirup can be adjusted rapidly.

Other objects and a fuller understanding of the invention will be apparent from the following description and claims.

We have discovered that heating maple sirup for a relatively short time at a temperature of at least about 298° F. provides a maple sirup of markedly different properties than those obtained previously.

According to the present invention a maple sirup or a mixture of maple sirup and simple sirups is continuously introduced under pressure into a first zone and heated substantially instantly to a temperature of at least about 298° F. for a time sufficient to produce flavor and color enhancement, the heated maple sirup forced into a second zone and rapidly cooled to below its atmospheric boiling point, and the cooled sirup released to atmospheric pressure.

The first zone is typically a heat exchanger where steam under pressure can heat the sirup substantially instantly to the selected temperature. Other means of supplying heat, as circulating high-boiling liquids may be employed. The time of residence of the sirup in the first zone is determined by the volume of heating chamber and the rate at which the sirup moves through the chamber.

The sirup must be forced through the heating zone at a pressure about equal to or above the pressure of saturated steam at the temperatures employed, such pressure being sufficient to prevent the sirup from boiling at these temperatures. The sirup at these temperatures cannot be released to atmospheric pressure (there would be an explosive flashing-off of water vapor), but it is rapidly cooled to a temperature below the atmospheric boiling point of the sirup in a second heat exchanger, as, for example, by cold water flowing over a coil to dissipate the heat. The sirup then exits to atmospheric pressure through a relief valve. Pressure on the sirup and flow rate can be regulated by appropriate adjustments to the force providing means and to the flow resisting means.

The process of the present invention provides maple sirups of unique characteristics. Comparison of time-temperature data, as obtained in the accompanying examples, indicates that at the high temperatures of the present process the flavor intensification proceeds at a faster rate than color development. Not only is there an increase in typical maple flavor, but new factors appear to be activated. The causes are not as yet understood, but apparently the high temperatures cause new reactions, perhaps of lignin compounds which are quite stable below about 300° F., creating new flavor components or potentiators for typical flavor components. When a relatively light-colored, high-flavored maple product is desired the process is operated to heat the maple sirup at a temperature of about 300° F. or higher for only a few minutes. If a more acrid, darker-colored product is desired the sirup is held at a high temperature, preferably above 305° F., for a longer period of time, such as about 30 minutes.

The degree of flavor intensification can be rigidly controlled by regulating flow through the heat chamber (volume pumped per unit of time) and pressure (temperature of steam in the heat exchanger). The ability to cool the sirup rapidly prevents off-flavors such as the stack burn of conventional heat-treating processes.

Packaging of the product can be coordinated with the process. The cooling is adjusted to provide a temperature below boiling (typically about 219° F.) at the relief valve, but sufficiently high, above about 180° F. to be bacteriostatic, and the sirup is packaged to provide a product which is stable on prolonged storage.

The following examples are illustrative of the process of the present invention, but are not intended to be in limitation thereof.

*Example 1*

A table U.S. grade AA maple sirup was pumped from a reservoir into a heat exchanger. The variable speed metering pump used could be adjusted to deliver 25 to 133 ml. per minute against pressures to 1000 p.s.i.g. The heat exchanger, four 8 foot lengths of jacketed ⅜″ stainless steel tubing, was heated by steam which could be provided at pressures of 0 to 100 p.s.i.g. The heating zone was folowed by a cooling zone; two 8 foot lengths of similar jacketed tubing through the jacket of which cold water was circulated. Thermometers were installed in the sirup line at the end of the heating unit and at the end of the cooling unit. Following the cooling unit is an adjustable relief vave and the system terminates in a means for collecting the product at atmospheric pressure.

The pump was adjusted to high speed (high volume) and, when the system was full, the relief valve was adjusted to restrict flow of the sirup and provide a pressure on the sirup of 100 p.s.i.g. Steam was allowed to flow through the heat exchanger and adjusted so that the sirup was heated to 287° F. Residence time (hold-up) of the sirup in the heat exchanger was 4.3 minutes. Water-flow through the cooling coil was adjusted to cool the heated sirup to about room temperature. When the system was in equilibrium a sample was taken. The flow rate was reduced so that hold-up time was 14.6 minutes in the heated tubing and a representative sample of product was collected. The temperature in the heat exchanger was increased (by increasing the steam pressure) to provide several levels of temperature, as shown in Table I. At each temperature the sirup was pumped at two rates to provide two hold-up times. Color of the resulting products was determined by comparison with McAdams color standards. Flavor was determined organoleptically by comparison with untreated portions of the sirup. Some of the data obtained is presented in Table I.

*Example 2*

A vacuum concentrated maple sirup was heated to temperatures of 307–324° F. for from 4.3 to 14.6 minutes and then cooled rapidly by the methods described in Example 1. The sirup, originally devoid of maple flavor and extremely light straw-colored (only 65 on the McAdams scale), rapidly developed color and maple flavor, as demonstrated by the data in Table II.

*Example 3*

A table U.S. grade A maple sirup was processed in the apparatus described in Example 1. The sirup was heated at 307, 324 and 338° F. for from 4.3 to 24.3 minutes. Representative samples were collected and evaluated for color and flavor. Data pertaining to this example are presented in Table III.

The foregoing examples show that the process of the present invention is applicable generally to maple sirups, whether a bland sirup or one already having marked maple flavor, resulting in an intensification of maple flavor. the means of heating, cooling and regulating the rate of flow of the maple sirup provide a reproducible combination of conditions so that flavor intensification and development of color can be controlled.

TABLE I.—EFFECT OF HIGH-FLAVORING PROCESS ON COLOR AND FLAVOR OF TABLE U.S. GRADE AA MAPLE SIRUP

| Conditions | | Sirup Characteristics | | |
|---|---|---|---|---|
| Temp., ° F. | Hold-up [1] | Color [2] | Flavor | |
| | | | Maple | Caramel |
| 0 | 0 | 100 | 1 | 0 |
| 287 | 4.3 | 105 | 1¼ | 0 |
| 287 | 14.6 | 130 | 2 | 0 |
| 298 | 4.3 | 105 | 1½ | 0 |
| 298 | 14.6 | 160 | 2+ | 1 |
| 307 | 4.3 | 125 | 1½ | 0 |
| 307 | 14.6 | 180 | 2+ | 1 |
| 316 | 4.3 | 130 | 1½ | 0 |
| 316 | 14.6 | 215 | 2+ | 2+ |
| 324 | 4.3 | 145 | 2 | |
| 324 | 14.6 | >220 | Much | 0 |
| 331 | 4.3 | >220 | Much | |

[1] Time being heated in minutes.
[2] Relative color value on McAdams scale.

TABLE II.—EFFECT OF HIGH-FLAVORING PROCESS ON COLOR AND FLAVOR OF VACUUM CONCENTRATED MAPLE SIRUP

| Conditions | | Sirup Characteristics | | |
|---|---|---|---|---|
| Temp., ° F. | Hold-up [1] | Color [2] | Flavor | |
| | | | Maple | Caramel |
| 0 | 0 | 65 | 0 | 0 |
| 307 | 4.3 | 120 | ¼ | 0 |
| 307 | 5.3 | 130 | ¾ | 0 |
| 307 | 7.7 | 135 | 1 | 0 |
| 307 | 10 | 135 | 1½ | 0 |
| 307 | 12.3 | 140 | 2 | 0 |
| 324 | 7.7 | 145 | 2¼ | Trace |
| 324 | 12.3 | 160 | 2+ | ¼ |
| 324 | 14.6 | 185 | 2+ | 1 |

[1] Time being heated in minutes.
[2] Relative color value on McAdams scale.

TABLE III.—EFFECT OF HIGH-FLAVORING PROCESS ON COLOR AND FLAVOR OF TABLE U.S. GRADE A MAPLE SIRUP

| Conditions | | Sirup Characteristics | | |
|---|---|---|---|---|
| Temp., ° F. | Hold-up [1] | Color [2] | Flavor | |
| | | | Maple | Caramel |
| 0 | 0 | 115 | 1 | 0 |
| 307 | 4.3 | 140 | 1+ | 0 |
| 307 | 7.7 | 155 | 2 | 0 |
| 307 | 10.6 | 175 | 2+ | 1 |
| 307 | 15.0 | 190 | 2+ | 1 |
| 307 | 24.3 | 210 | 2+ | 2 |
| 324 | 4.3 | 145 | 2 | 0 |
| 324 | 7.7 | 175 | 2+ | 1 |
| 324 | 10.6 | 210 | 2+ | 2 |
| 324 | 15.0 | >220 | 2+ | 2+ |
| 324 | 24.3 | >220 | 2+ | 2+ |
| 338 | 4.3 | 180 | 2+ | 1 |
| 338 | 7.7 | 210 | 2+ | 2+ |
| 338 | 10.6 | >220 | 2+ | 2++ |
| 338 | 15.0 | >220 | Very strong | |
| 338 | 24.3 | >220 | Very strong | |

[1] Time being heated in minutes.
[2] Relative color value on McAdams scale.

Maple sirup products prepared by the present process, as indicated by the data of the tables, can have any of a wide range of color and flavor characteristics. The product of Example 1 when the sirup introduced (under at least about 60 p.s.i.g. pressure) into the heat exchanger was heated at 307° F. for 4.3 minutes had, as shown in Table I, only a slight increase in color (125 vs. 100 for the control) and was free of off-flavors, but the maple flavor was enhanced significantly, providing a premium quality table sirup. Referring again to Table I, increasing the temperature to which the sirup was heated to 324° F. (pressure on sirup being at least about 80 p.s.i.g.) and heating for 4.3 minutes gave a product of excellent properties for preparing blended sirups. A product such as that of Table III, last item, prepared by introducing the sirup at 100 p.s.i.g. and heating at 338° F. for 24.3 minutes, will impart maple flavor to foods when the sirup of intensified flavor and color is combined at very low levels.

We claim:

1. A continuous process for preparing maple sirup of intensified flavor and color comprising introducing a maple sirup under pressure into a first zone, heating said sirup in said first zone to a temperature of at least about 298° F. for a time sufficient to produce increased flavor and color, said pressure being sufficient to prevent boiling of said sirup at said temperature, conducting the heated sirup to a second zone, cooling the heated sirup rapidly in said second zone to below its boiling point at atmospheric pressure, releasing the cooled sirup from said second zone to atmospheric pressure, and collecting the released sirup.

2. The process of claim 1 in which the maple sirup is heated to a temperature in the range of about 298 to 338° F. for from about 24.3 to 4.3 minutes.

3. A continuous process for preparing maple sirup of intensified flavor and color comprising introducing a maple sirup under pressure into a first zone, heating said sirup in said first zone to a temperature of at least about 298° F. for a time sufficient to produce increased flavor and color, said pressure being sufficient to prevent boiling of said sirup at said temperature, conducting the heated sirup to a second zone, cooling the heated sirup rapidly in said second zone to a temperature in the range of about 180° F. to just below the normal boiling point at atmospheric pressure of standard density sirup, releasing the cooled sirup from said second zone to atmospheric pressure, and packaging the released maple sirup product.

4. A flexible continuous process whereby time-temperature conditions applied to a maple sirup can be adjusted rapidly to control intensification of the color and flavor of the maple sirup product comprising introducing said maple sirup under pressure at a first flow rate into a first zone, heating said sirup in said first zone to a first temperature of at least about 298° F., said pressure being sufficient to prevent boiling of said sirup at said first temperature, conducting the heated sirup to a second zone, cooling the heated sirup rapidly in said second zone to below its boiling point at atmospheric pressure, releasing the cooled sirup from said second zone to atmospheric pressure, collecting a portion of said cooled sirup, comparing the color and flavor of said cooled sirup with predetermined standards, adjusting at least one of the group consisting of said first flow rate and said first temperature to a second flow rate and a second temperature, heating in said first zone, cooling in said second zone, collecting the cooled sirup, again comparing the color and flavor with said predetermined standards, and repeating adjustment of flow rate and temperature as necessary to provide a maple sirup product of desired color and flavor.

5. A continuous process for preparing a premium quality maple table sirup comprising introducing a table U.S. Grade AA maple sirup under about 60 p.s.i.g. pressure into a first zone, heating the sirup in said first zone to a temperature of about 307° F. for about 4.3 minutes, conducting the heated sirup to a second zone, cooling the heated sirup in said second zone to below its boiling point at atmospheric pressure, releasing the cooled sirup from said second zone to atmospheric pressure, and collecting the released sirup, the collected sirup, by comparison with the introduced sirup, being characterized by a significantly enhanced maple flavor, no detectable off-flavors, and only slight increase in color.

6. A continuous process for preparing maple sirup of intensified flavor and color comprising introducing a table U.S. Grade AA maple sirup under about 80 p.s.i.g. pressure into a first zone, heating said sirup in said first zone to a temperature of about 324° F. for about 4.3 minutes, conducting the heated sirup to a second zone, cooling the heated sirup in said second zone to below its boiling point at atmospheric pressure, releasing the cooled sirup from said second zone, and collecting the released sirup, the collected sirup being characterized by at least a two-fold increase in maple flavor, substantially free of off-flavors, and a color value of about 145 on McAdams scale.

7. A continuous process for preparing a maple sirup which imparts maple flavor to a food when present in the food at very low levels comprising introducing a table grade maple sirup under about 100 p.s.i.g. pressure into a first zone, heating the sirup in said first zone to a temperature of about 339° F. for about 24.3 minutes, conducting the heated sirup to a second zone, cooling the heated sirup in said second zone to below its boiling point at atmospheric pressure, releasing the cooled sirup from said second zone, and collecting the released sirup.

References Cited

UNITED STATES PATENTS 2,054,873   9/1936   Whitby _____ 99—142 X

A. LOUIS MONACELL, *Primary Examiner.*

S. E. HEYMAN, *Assistant Examiner.*